United States Patent [19]

Nakabayashi et al.

[11] Patent Number: 5,445,669
[45] Date of Patent: Aug. 29, 1995

[54] MEMBRANE FOR THE SEPARATION OF CARBON DIOXIDE

[75] Inventors: Makoto Nakabayashi; Kazuhiro Okabe; Takayuki Mishima; Hiroshi Mano, all of Osaka; Kenji Haraya, Ibaraki, all of Japan

[73] Assignees: Sumitomo Electric Industries, Ltd.; Director-General of Agency of Industrial Science and Technology; Research Institute of Innovative Technology for the Earth

[21] Appl. No.: 288,198

[22] Filed: Aug. 9, 1994

[30] Foreign Application Priority Data

Aug. 12, 1993 [JP] Japan ................... 5-220651
Oct. 19, 1993 [JP] Japan ................... 5-284436

[51] Int. Cl.$^6$ ................... B01D 53/22; B01D 69/08
[52] U.S. Cl. ................... 96/5; 95/44; 95/51; 96/10; 423/226; 423/229; 423/232
[58] Field of Search ............ 95/44, 51, 236; 96/4, 96/5, 10; 423/220, 226, 229, 232

[56] References Cited

U.S. PATENT DOCUMENTS

| | | | |
|---|---|---|---|
| 3,396,510 | 8/1968 | Ward et al. | 55/16 |
| 3,911,080 | 10/1975 | Mehl et al. | 423/220 X |
| 4,089,653 | 5/1978 | Ward, III | 23/284 |
| 4,115,514 | 9/1978 | Ward, III | 95/44 X |
| 4,117,079 | 9/1978 | Bellows | 95/51 X |
| 4,147,754 | 4/1979 | Ward, III | 95/44 X |
| 4,174,374 | 11/1979 | Matson | 95/44 X |
| 4,239,506 | 12/1980 | Steigelmann et al. | 95/44 |
| 4,714,482 | 12/1987 | Polak | 55/158 |
| 4,737,166 | 4/1988 | Matson et al. | 95/44 |
| 4,741,744 | 5/1988 | Wu et al. | 95/51 X |
| 4,789,386 | 12/1988 | Vaughn et al. | 95/51 |
| 4,808,284 | 2/1989 | Bedell et al. | 423/229 X |
| 4,824,443 | 4/1989 | Matson et al. | 95/44 |
| 4,906,376 | 3/1990 | Fyles | 210/500 |
| 4,954,145 | 9/1990 | Thakore | 55/16 |
| 5,135,547 | 8/1992 | Tsou et al. | 95/44 |
| 5,281,254 | 1/1994 | Birbara et al. | 95/44 |

OTHER PUBLICATIONS

Chemical & Engineering Process CEP 85 (1989) Mar. No. 3, pp. 58–70.

*Primary Examiner*—Robert Spitzer
*Attorney, Agent, or Firm*—Lorusso & Loud

[57] ABSTRACT

A membrane for the separation of carbon dioxide is disclosed which includes a hydrogel film of a cross-linked, vinyl alcohol/acrylic acid salt copolymer impregnated with an aqueous carrier solution containing a carbon dioxide carrier dissolved therein. A composition containing a solvent, an alkali metal carbonate or bicarbonates, and a polydentate ligand capable of forming a complex with an alkali metal ion is suitably used as the carrier solution. This composition may also be used for the preparation of a liquid film of a carbon dioxide separation membrane.

11 Claims, No Drawings

MEMBRANE FOR THE SEPARATION OF CARBON DIOXIDE

BACKGROUND OF THE INVENTION

This invention relates to a membrane useful for separating carbon dioxide from a carbon dioxide-containing gas mixture and to a method of preparing such a membrane. The present invention is also directed to a carbon dioxide carrier composition useful for the formation of such a membrane.

One known method for the separation of carbon dioxide from a carbon dioxide-containing gas mixture uses a liquid film across which carbon dioxide is selectively transported. The liquid film contains dissolved therein a carrier substance, typically an alkali metal carbonate (Science, 115, 44(1967); Science, 156, 1481(1967)). While the known liquid film has relatively good carbon dioxide selectivity and carbon dioxide permeability, the separation efficiency thereof is not fully satisfactory in actual, large scale utilization. In particular, the known liquid film poses a problem of leakage or drying up of the carrier liquid during use.

SUMMARY OF THE INVENTION

It is, therefore, an object of the present invention to provide a carbon dioxide separation membrane which is devoid of the drawbacks of the conventional membrane.

Another object of the present invention is to provide a carbon dioxide separation membrane which can be used for a long period of time in a stable manner.

It is a further object of the present invention to provide a membrane which has excellent carbon dioxide separation efficiency.

In accomplishing the foregoing objects, there is provided in accordance with one aspect of the present invention a membrane for the separation of carbon dioxide, which comprises a hydrogel film of a cross-linked copolymer of vinyl alcohol with acrylic acid or a salt thereof, wherein the copolymer is impregnated with an aqueous solution containing a carbon dioxide carrier dissolved therein.

In another aspect, the present invention provides a membrane for the separation of carbon dioxide, which comprises a liquid film of a solvent solution containing dissolved therein (a) at least one alkali metal salt selected from the group consisting of alkali metal carbonates and alkali metal bicarbonates and (b) a polydentate ligand capable of forming a complex with an alkali metal ion, the solvent being selected from the group consisting of water, polar organic solvents and mixtures thereof.

The present invention also provides a carbon dioxide carrier composition which comprises (a) a solvent selected from the group consisting of water, polar organic solvents and mixtures thereof, (b) at least one alkali metal salt dissolved in the solvent and selected from the group consisting of alkali metal carbonates and alkali metal bicarbonates, and (c) a polydentate ligand dissolved in the solvent and capable of forming a complex with an alkali metal ion.

In a further aspect, the present invention provides a method of preparing a membrane, which comprises the steps of:

applying an aqueous solution of a cross-linkable copolymer of vinyl alcohol with acrylic acid or a salt thereof to a carbon dioxide permeable support;

cross-linking the copolymer applied to the support to obtain a water-insoluble polymer layer; and impregnating the polymer layer with an aqueous solution containing dissolved therein a carbon dioxide carrier to form a hydrogel of the cross-linked copolymer.

Further objects, features and advantages of the present invention will become apparent from the detailed description of the preferred embodiments to follow.

DETAILED DESCRIPTION OF THE PREFERRED EMBODIMENTS OF THE INVENTION

The carbon dioxide separation membrane according to one embodiment of the present invention includes a hydrogel film of a cross-linked copolymer of vinyl alcohol with acrylic acid and/or a salt thereof. The copolymer is impregnated with an aqueous solution containing dissolved therein a carbon dioxide carrier.

The cross-linked, vinyl alcohol/acrylic acid (or a salt thereof) copolymer has a high water absorbing power and the hydrogel thereof exhibits high mechanical strengths. The copolymer generally has an acrylic acid (or salt) content of 5–95 mole %, preferably 30–70 mole %. The acrylic acid salt may be, for example, an alkali metal salt, e.g. a sodium salt or a potassium salt, an ammonium salt or an organic ammonium salt.

The hydrogel film may be obtained as follows. First, a film of a noncross-linked copolymer of vinyl alcohol with an acrylic acid (or a salt thereof) is prepared. Various noncross-linked vinyl alcohol/acrylic acid (or a salt thereof) copolymers are commercially available (for example, Sumikagel L-5H manufactured by Sumitomo Chemical Industry Inc.) and they may be suitably used for the purpose of the present invention. The vinyl alcohol/acrylic acid (or a salt thereof) copolymer is formed into a film and is then cross-linked to obtain a film of the cross-linked copolymer. The formation of the film may be performed by any known method such as coating, extrusion or spreading. The cross-linking may be carried out by any suitable known way such as by heating the film at a temperature of 100°–150° C., by irradiating the film with an actinic light (e.g. a UV ray) or by reaction with a cross-linking agent.

The resultant cross-linked film, which generally has a thickness of 100 $\mu$m or less, is then impregnated with an aqueous solution containing dissolved therein a carbon dioxide carrier, thereby to obtain the hydrogel film according to the present invention. Generally, the hydrogel film has a thickness of 0.1–500 $\mu$m.

Any conventionally known carbon dioxide carrier aqueous solution may be suitably used for the purpose of the present invention. The carbon dioxide carrier is an organic or inorganic substance soluble in water to form an aqueous alkaline solution and capable of capturing carbon dioxide. Illustrative of suitable carbon dioxide carriers are alkali metal carbonates, alkali metal bicarbonates, alkanolamines, alkali metal salts of organic acids and mixtures thereof.

Examples of the alkali metal carbonates and alkali metal bicarbonates include lithium carbonate, sodium carbonate, potassium carbonate, rubidium carbonate, cesium carbonate, lithium bicarbonate, sodium bicarbonate, potassium bicarbonate, rubidium bicarbonate and cesium bicarbonate. The concentration of the alkali metal carbonate or bicarbonate in the aqueous solution is generally 0.1–5.0 mol/liter, preferably 1.0–4.0 mol/liter.

Examples of alkanolamines include monoethanolamine, diethanolamine, triethanolamine, monopropanolamine, dipropanolamine and tripropanolamine. The concentration of the alkanolamine in the aqueous solution is generally at least 3% by weight.

The hydrogel film of the above cross-linked copolymer is considered to be composed of polyvinyl alcohol-rich phases and polyacrylic acid salt-rich phases. The phases which are rich in a polyacrylic acid salt are swelled by absorption of a large amount of the aqueous carrier solution to form gel phases. The polyvinyl alcohol-rich phases, on the other hand, are only slightly swelled with the aqueous solution but are drawn and oriented upon the swelling of the polyacrylic acid salt-rich phases, so that the gel phases are supported by the oriented polyacrylic acid salt-rich phases. As a consequence of the above structure, even though the membrane is thin, the high water-content hydrogel film can retain its shape upon being subjected to a pressure and can function as the carbon dioxide separation membrane for a long service life while exhibiting good water-retentivity and weatherability.

It is preferred that the hydrogel film be supported by a carbon dioxide permeable support. The support preferably has a carbon dioxide permeation rate of $10^{-5}$ $cm^3(STP)/cm^2.sec.cmHg$. In the case of a porous support, the pore diameter thereof is preferably 10 μm or less, more preferably 1 μm or less. The use of a porous support having a high porosity is preferred for reasons of easy permeation of carbon dioxide. The support may be formed of a plastic material, a ceramic, a metal, a glass or any other suitable material and may be in the form of a film, a hollow fiber, a cylinder, a woven or non-woven fabric, a paper or any other desired shape. The support generally has a thickness of 5,000 μm or less, preferably 10–500 μm.

The carbon dioxide separation membrane including the support, and the hydrogel film supported thereby may be prepared by a method which includes the steps of: applying an aqueous solution of a cross-linkable vinyl alcohol/acrylic acid (or a salt thereof) copolymer to a carbon dioxide permeable support; cross-linking the copolymer applied to the support to obtain a water-insoluble polymer layer; and impregnating the polymer layer with an aqueous solution containing dissolved therein a carbon dioxide carrier to form a hydrogel film of the cross-linked copolymer supported by the support.

The aqueous solution of the cross-linkable copolymer is generally up to 20% by weight, preferably 0.5–5% by weight. The cross-linking is preferably performed by heating the copolymer at a temperature of 100°–150° C. for 0.5–2 hours. The thickness of the hydrogel film is generally 1–200 μm. In the thus prepared composite membrane, at least part of the support is impregnated, in the thickness direction, with the hydrogel film. The degree of impregnation depends upon the hydrophilicity and porosity of the support.

In the present invention, a novel carrier including (a) at least one alkali metal salt selected from alkali metal carbonates and alkali metal bicarbonates and (b) a polydentate ligand capable of forming a complex with an alkali metal ion is especially suitably used.

Examples of the alkali metal carbonates and alkali metal bicarbonates include those described previously. Examples of the polydentate ligands include cyclic polyethers, cyclic polyetheramines, bicyclopolyetheramines, cyclic polyamines, non-cyclic polyethers, polyaminocarboxylic acids, polyaminophosphoric acids, oxycarboxylic acids, condensed phosphoric acids, non-cyclic polyamines, acetylacetone, oxine, natural products and salts or partial salts of these compounds. These polydentate ligands may be used by themselves or in combination of two of more.

Illustrative of suitable cyclic polyether ligands are 12-crown-4, 15-crown-5, 18-crown-6, benzo-12-crown-4, benzo-15-crown-5, benzo-18-crown-6, dibenzo-12-crown-4, dibenzo-15-crown-5, dibenzo-18-crown-6, dicyclohexyl-18-crown-4, dicyclohexyl-15-crown-5, dicyclohexyl-18-crown-6, n-octyl-12-crown-4, n-octyl-15-crown-5 and n-octyl-18-crown-6.

Illustrative of suitable cyclic polyetheramine ligands are cryptand[2.1] and cryptand[2.2].

Illustrative of suitable bicyclopolyetheramines are cryptand[2.2.1] and cryptand[2.2.2].

Illustrative of suitable cyclic polyamines are 1,4,7,10,13,16-hexaazacyclooctadecane and 8-azaadenine.

Illustrative of suitable non-cyclic polyethers are polyethylene glycol, polyethylene glycol monoalkyl ethers and polypropylene glycol.

Illustrative of suitable polyaminocarboxylic acids are ethylenediaminetetraacetic acid, iminodiacetic acid, nitrilotriacetic acid, hydroxyethyliminodiacetic acid, trans-1,2-diaminocyclohexane-N,N,N',N'-tetraacetic acid, ethylenediaminediacetic acid, triethylenetetraminehexaacetic acid, glycoletherdiaminetetraacetic acid, diethyltriamine-N,N,N',N',N''-pentaacetic acid and hydroxyethylethylenediaminetriacetic acid.

Illustrative of suitable polyaminophosphoric acids are ethylenediaminetetrakis(methylenephosphonic acid) and nitrilotris(methylenephosphonic acid).

Illustrative of suitable non-cyclic polyamines are ethylenediamine, diethylenetriamine and triethylenetetramine.

Illustrative of a suitable oxycarboxylic acid is citric acid.

Illustrative of suitable natural products are glycine, hemin, chlorophyl, valinomycin and nigericin.

The novel carrier composed of at least one alkali metal salt selected from alkali metal carbonates and alkali metal bicarbonates and a polydentate ligand capable of forming a complex with an alkali metal ion may be suitably incorporated into the above-described hydrogel. Alternatively, the novel carrier may be used in the form of a conventional liquid film as a membrane for separating carbon dioxide. This embodiment will be described below.

For the preparation of the liquid film, the carrier composed of the alkali metal salt and the polydentate ligand is dissolved in a suitable solvent to form a carrier solution. Any solvent may be used as long as both the alkali metal salt and the polydentate ligand are soluble therein. Generally, water, a polar organic solvent or a mixture thereof may be suitably used. The polar organic solvent is a solvent containing a hetero atom such as N, S or O and preferably has a boiling point of at least 100° C., more preferably at least 150° C. Illustrative of suitable polar organic solvents are imidazole, N-substituted imidazoles (e.g. N-methylimidazole, N-propylimidazole, N-phenylimidazole and N-benzylimidazole), dialkylsulfoxides (e.g. dimethylsulfoxide and dioctylsulfoxide) and N,N-dialkylformamides (e.g. N,N-dimethylformamide and N,N-dioctylformamide).

The concentration of the alkali metal salt in the carrier solution is generally 0.1–5 mol/liter, preferably 1–4 mol/liter. A concentration of the alkali metal salt below 0.1 mol/liter is insufficient to effectively absorb carbon dioxide. Too high a concentration of the alkali metal salt in excess of 5 mol/liter, on the other hand, is undesirable because the transportation speed of the absorbed carbon dioxide is slow. The concentration of the polydentate ligand is generally 0.001–1 mol/liter, preferably 0.01–0.1 mol/liter.

The above carrier solution is then supported and immobilized on a permeable support to obtain a carbon dioxide separation membrane. The above-described support for supporting the hydrogel may be used in this embodiment. Because of excellent carbon dioxide separation efficiency, the carrier solution may also be utilized as an absorbent solution for the separation of carbon dioxide by an absorption method or by a flow liquid membrane method.

The separation of carbon dioxide from a gas mixture containing carbon dioxide with the use of the carbon dioxide separation membrane will now be described. The membrane is mounted on a conventional permeable cell. A first side of the membrane is contacted with the gas mixture maintained at a pressure higher than that on the opposite, second side of the membrane. Generally, the space on the second side of the membrane is maintained in a reduced pressure. Thus, the first side of the membrane serves to function as a carbon dioxide absorbing surface while the second side thereof as a carbon dioxide discharging surface.

For example, when the membrane includes a hollow thread support by which the above-described carrier-containing hydrogel film or liquid film is supported, the inside or outside of the hollow thread is used as a carbon dioxide absorbing surface. Thus, for example, when the hollow thread-type membrane is disposed in a stream of the mixed gas to be treated, the exterior surface thereof serves as a carbon dioxide absorbing surface. The carbon dioxide preferentially absorbed in the carrier liquid is transported by the carrier to the interior surface of the hollow thread where the carbon dioxide is liberated from the carrier and is discharged to the inside space of the hollow thread. Because of the above function of the carbon dioxide carrier, the amount of the carbon dioxide which permeates through the membrane is much greater in comparison with a case where no carrier is used so that respective components in the mixed gas permeate through the membrane merely due to the pressure difference between the inside and outside of the hollow thread.

The following examples will further illustrate the present invention.

PREPARATION OF MEMBRANE HAVING HYDROGEL FILM

Example 1

An aqueous vinyl alcohol/sodium acrylate random copolymer solution (SUMIKAGEL L-5H manufactured by Sumitomo Chemical Industry, Inc.; vinyl alcohol content: 60 mole %, copolymer content: 5% by weight) was applied on a surface of a poly(vinylidene fluoride) porous film (GVWP manufactured by Milipore Inc.; hydrophilic film; pore diameter: 0.22 $\mu$m; thickness: 110 $\mu$m) by a spin coating method (1,500 rpm, 12 seconds) so that the film was impregnated with the copolymer solution. The resultant film was then heated at 120° C. for 1 hour to cross-link the copolymer and, thereafter, immersed in an aqueous potassium carbonate solution (potassium carbonate concentration: 2 mols/liter) for 30 minutes, so that the cross-linked copolymer was swelled to form a hydrogel film supported by the poly(vinylidene fluoride) film. The gel membrane was laminated on a silicone rubber film (thickness: 70 $\mu$m) to obtain a laminate membrane.

Example 2

Example 1 was repeated in the same manner as described except that a dipping method was substituted for the spin coating method.

Example 3

Example 1 was repeated in the same manner as described except that the poly(vinylidene fluoride) film was substituted with a polytetrafluoroethylene porous film (FP010 manufactured by Sumitomo Electric Industries, Ltd.; pore diameter: 0.1 $\mu$m; thickness: 55 $\mu$m) and that the spin coating method was substituted with a casting method.

SEPARATION OF CARBON DIOXIDE

Example 4

Each of the laminate membranes obtained in Examples 1–3 was tested for the carbon dioxide separation performance. A test gas composed of 10% by volume of carbon dioxide and 90% by volume of nitrogen was fed to one side of the membrane (effective surface: 9.62 cm$^2$) under a saturated water vapor pressure at a flow rate of 60 ml/minute and a total pressure of 1 atm at 25° C., while maintaining the other side of the membrane in a reduced pressure of 2.3 cmHg. The gas which permeated through the membrane was analyzed by gas chromatography for the calculation of the carbon dioxide permeation rate Rc (cm$^3$/cm$^2$.sec.cmHg) and the separation factor S. The separation factor S is defined as follows:

$$S = Rc/Rn$$

where Rc is a carbon dioxide permeation rate and Rn is a nitrogen permeation rate.

The results are summarized in Table 1.

TABLE 1

| Membrane | Permeation Rate Rc | Separation Factor S |
|---|---|---|
| Example 1 | 4.2 × 10$^{-6}$ | 294 |
| Example 2 | 3.2 × 10$^{-6}$ | 261 |
| Example 3 | 2.0 × 10$^{-6}$ | 224 |

Example 5

The carbon dioxide separation was continued for 30 days using the membrane obtained in Example 1 in the same manner as that in Example 4. The carbon dioxide separation performance after 1, 10, 20 and 30 days from the commencement of the separation test are shown in Table 2.

TABLE 2

| Test period | Permeation Rate Rc | Separation Factor S |
|---|---|---|
| 1 day | 2.8 × 10$^{-6}$ | 212 |
| 10 days | 1.7 × 10$^{-6}$ | 161 |
| 20 days | 1.5 × 10$^{-6}$ | 125 |
| 30 days | 1.8 × 10$^{-6}$ | 143 |

Comparative Example

Example 1 was repeated in the same manner as described except that the aqueous potassium carbonate solution was directly applied to the poly(vinylidene fluoride) porous film without the cross-linked, vinyl alcohol/sodium acrylate random copolymer layer, thereby to obtain a membrane having a liquid film supported on the film. Using the thus obtained membrane, Example 5 was repeated in the same manner as described. After one day, however, the carbon dioxide separation was no longer able to be continued because of the drying up of the liquid film.

PREPARATION OF MEMBRANE HAVING LIQUID FILM

Example 6

Various aqueous carrier solutions No. 1–13 having the compositions shown in Table 3 were prepared. A poly(vinylidene fluoride) porous film (GVWP manufactured by Milipore Inc.; hydrophilic film; pore diameter: 0.22 μm; porosity: 75%; thickness: 110 μm) was immersed in each carrier solution for 30 minutes for impregnation, thereby to obtain a liquid film supported by the poly(vinylidene fluoride) film. The thus obtained membrane was laminated on a PTFE (polytetrafluoroethylene) film (pore diameter: 0.1 μm) to obtain a laminated membrane.

TABLE 3

| Solution | Alkali metal salt | | Polydentate ligand | |
|---|---|---|---|---|
| No. | Kind | Amount*1 | Kind | Amount*1 |
| 1 | $K_2CO_3$ | 2 | 18-crown-6 | 0.04 |
| 2 | $K_2CO_3$ | 2 | 18-crown-6 | 0.05 |
| 3 | $K_2CO_3$ | 2 | cryptand[2.1] | 0.05 |
| 4 | $K_2CO_3$ | 2 | cryptand[2.1] | 0.07 |
| 5 | $K_2CO_3$ | 2 | cryptand[2.1] | 0.1 |
| 6 | $K_2CO_3$ | 2 | cryptand[2.2.2] | 0.02 |
| 7 | $K_2CO_3$ | 2 | EDTA*2 | 0.05 |
| 8 | $Na_2CO_3$ | 2 | EDTA.2Na*3 | 0.03 |
| 9 | $K_2CO_3$ | 2 | NTAA*4 | 0.05 |
| 10 | $K_2CO_3$ | 2 | TETHA*5 | 0.05 |
| 11 | $K_2CO_3$ | 2 | triethylenetetramine | 0.5 |
| 12*6 | $K_2CO_3$ | 2 | — | — |
| 13*6 | $Na_2CO_3$ | 2 | — | — |

*1: mol/liter
*2: ethylenediaminetetraacetic acid
*3: ethylenediaminetetraacetic acid disodium salt
*4: nitrilotriacetic acid
*5: triethylenetetraminetetraacetic acid
*6: comparative solution 18-Crown-6, cryptand[2.1] and cryptand[2.2.2] have the following chemical structures.

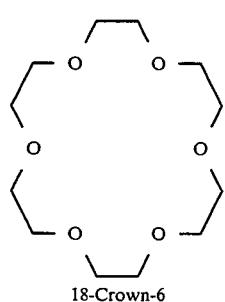

18-Crown-6

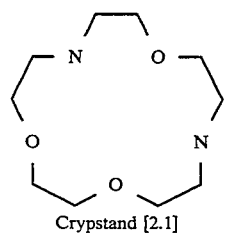

Crypstand [2.1]

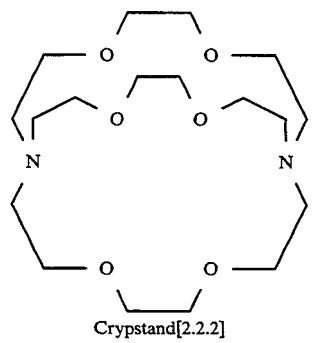

Crypstand[2.2.2]

SEPARATION OF CARBON DIOXIDE

Example 7

Each of the laminate membranes obtained in Example 6 was tested for the carbon dioxide separation performance. A test gas composed of 10% by volume of carbon dioxide and 90% by volume of nitrogen was fed to one side of the membrane (effective surface: 2.54 cm$^2$) under a saturated water vapor pressure at a flow rate of 100 ml/minute and a total pressure of 1 atm, while maintaining the other side of the membrane in a reduced pressure. The gas which permeated through the membrane was analyzed by gas chromatography for the calculation of carbon dioxide permeation rate Rc and separation factor S in the same manner as that in Example 4. The results are summarized in Table 4.

PREPARATION OF MEMBRANE HAVING HYDROGEL FILM

Example 8

An aqueous vinyl alcohol/sodium acrylate random copolymer solution as used in Example 1 was applied on a surface of a poly(vinylidene fluoride) porous film by a spin coating method and the resultant film was thereafter heated at 120° C. for 1 hour to cross-link the copolymer. This was then immersed in each one of the aqueous carrier solutions No. 1–11 having the compositions shown in Table 3 for 30 minutes, so that the cross-linked copolymer was swelled to form a hydrogel film supported by the poly(vinylidene fluoride) film. The gel membrane was laminated on a PTFE film to obtain a laminate membrane. Each of the laminate membranes thus obtained was tested in the same manner as described in Example 7 to reveal that these membranes exhibited good permeation rate and separation factor. It was also confirmed that these membranes exhibited satisfactory carbon dioxide separation performance even after 1 week continuous operation.

TABLE 4

| Membrane | Permeation Rate Rc | Separation Factor S |
|---|---|---|
| Solution No. 1 | $1.1 \times 10^{-5}$ | 545 |

TABLE 4-continued

| Membrane | Permeation Rate Rc | Separation Factor S |
|---|---|---|
| Solution No. 2 | $7.4 \times 10^{-6}$ | 670 |
| Solution No. 3 | $2.0 \times 10^{-5}$ | 1,385 |
| Solution No. 4 | $2.5 \times 10^{-5}$ | 1,859 |
| Solution No. 5 | $2.0 \times 10^{-5}$ | 1,203 |
| Solution No. 6 | $1.2 \times 10^{-5}$ | 647 |
| Solution No. 7 | $2.4 \times 10^{-5}$ | 1,417 |
| Solution No. 8 | $6.0 \times 10^{-6}$ | 600 |
| Solution No. 9 | $1.1 \times 10^{-5}$ | 580 |
| Solution No. 10 | $1.2 \times 10^{-5}$ | 600 |
| Solution No. 11 | $1.6 \times 10^{-5}$ | 504 |
| Solution No. 12* | $6.1 \times 10^{-6}$ | 317 |
| Solution No. 13* | $3.0 \times 10^{-6}$ | 153 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A membrane for the separation of carbon dioxide, comprising a hydrogel film of a cross-linked copolymer of vinyl alcohol with acrylic acid and/or a salt thereof, said copolymer being impregnated with an aqueous solution containing a carbon dioxide carrier dissolved therein.

2. A membrane as claimed in claim 1, wherein said carbon dioxide carrier is at least one member selected from the group consisting of (a) alkali metal carbonates, (b) alkali metal bicarbonates, (c) mixtures of an alkali metal carbonate with a polydentate ligand capable of forming a complex with an alkali metal ion, (d) mixtures of an alkali metal bicarbonate with a polydentate ligand capable of forming a complex with an alkali metal ion and (e) alkanolamines.

3. A membrane as claimed in claim 2, wherein said polydentate ligand is at least one compound selected from the group consisting of cyclic polyethers, cyclic polyetheramines, bicyclopolyetheramines, polyaminocarboxylic acids, polyaminocarboxylic acid salts and polyamines.

4. A membrane as claimed in claim 1, further comprising a carbon dioxide permeable support by which said hydrogel film is supported.

5. A membrane for the separation of carbon dioxide, comprising a liquid film of a solvent solution containing dissolved therein (a) at least one alkali metal salt selected from the group consisting of alkali metal carbonates and alkali metal bicarbonates and (b) a polydentate ligand capable of forming a complex with an alkali metal ion, said solvent being selected from the group consisting of water, polar organic solvents and mixtures thereof.

6. A membrane as claimed in claim 5, wherein said polydentate ligand is at least one compound selected from the group consisting of cyclic polyethers, cyclic polyetheramines, bicyclopolyetheramines, polyaminocarboxylic acids, polyaminocarboxylic acid salts and polyamines.

7. A membrane as claimed in claim 5, wherein said liquid film is supported by a carbon dioxide permeable support.

8. A membrane as claimed in claim 7, wherein said support is in the form of a hollow fiber, a sheet or a cylinder.

9. A carbon dioxide carrier composition comprising (a) a solvent selected from the group consisting of water, polar organic solvents and mixtures thereof, (b) at least one alkali metal salt dissolved in said solvent and selected from the group consisting of alkali metal carbonates and alkali metal bicarbonates, and (c) a polydentate ligand dissolved in said solvent and capable of forming a complex with an alkali metal ion.

10. A composition as claimed in claim 9, wherein said polydentate ligand is at least one compound selected from the group consisting of cyclic polyethers, cyclic polyetheramines, bicyclopolyetheramines, polyaminocarboxylic acids, polyaminocarboxylic acid salts and polyamines.

11. A method of preparing a membrane, comprising the steps of:
applying an aqueous solution of a cross-linkable copolymer of vinyl alcohol with acrylic acid and/or a salt thereof to a carbon dioxide permeable support;
cross-linking said copolymer applied to said support to obtain a water-insoluble polymer layer; and
impregnating said polymer layer with an aqueous solution containing dissolved therein a carbon dioxide carrier to form a hydrogel of said cross-linked copolymer.

* * * * *